(12) United States Patent
Gotou et al.

(10) Patent No.: US 8,307,629 B2
(45) Date of Patent: Nov. 13, 2012

(54) CONTROL METHOD OF EXHAUST EMISSION PURIFICATION SYSTEM AND EXHAUST EMISSION PURIFICATION SYSTEM

(75) Inventors: Shinji Gotou, Fujisawa (JP); Takashi Haseyama, Fujisawa (JP); Takao Onodera, Fujisawa (JP); Tatsuo Mashiko, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 678 days.

(21) Appl. No.: 12/449,018

(22) PCT Filed: Dec. 19, 2007

(86) PCT No.: PCT/JP2007/074433
§ 371 (c)(1),
(2), (4) Date: Jul. 21, 2009

(87) PCT Pub. No.: WO2008/090697
PCT Pub. Date: Jul. 31, 2008

(65) Prior Publication Data
US 2010/0024395 A1 Feb. 4, 2010

(30) Foreign Application Priority Data
Jan. 26, 2007 (JP) .................................. 2007-015858

(51) Int. Cl.
*F01N 3/00* (2006.01)
*F01N 3/02* (2006.01)
(52) U.S. Cl. ................. 60/277; 60/287; 60/292; 60/295; 60/297; 60/311

(58) Field of Classification Search ............... 60/273, 60/274, 277, 287, 292, 295, 297, 311
See application file for complete search history.

(56) References Cited

U.S. PATENT DOCUMENTS

| 2004/0231323 | A1* | 11/2004 | Fujita et al. ................... 60/284 |
| 2005/0217251 | A1 | 10/2005 | Sato et al. |
| 2005/0217252 | A1 | 10/2005 | Sato et al. |

FOREIGN PATENT DOCUMENTS

| CN | 1676891 | 10/2005 |
| EA | 1582721 | 10/2005 |
| JP | 04-081513 | 3/1992 |
| JP | 2004-108194 | 4/2004 |
| JP | 2005-139944 | 6/2005 |
| JP | 2005-139992 | 6/2005 |
| JP | 2005-282545 | 10/2005 |

(Continued)

OTHER PUBLICATIONS

International Search Report for PCT/JP2007/074433, mailed Mar. 4, 2008.

(Continued)

*Primary Examiner* — Binh Q Tran
*Assistant Examiner* — Audrey K Bradley
(74) *Attorney, Agent, or Firm* — Staas & Halsey LLP

(57) ABSTRACT

An exhaust emission purification system and a related method of control, wherein an exhaust throttle valve is opened if an engine load reaches at least a predetermined first judgment value during execution of forced regeneration control, and generating an alarm of failure of the exhaust throttle valve if the engine load reaches at least a second judgment value which is larger than the predetermined first judgment value.

4 Claims, 3 Drawing Sheets

FOREIGN PATENT DOCUMENTS

| | | |
|---|---|---|
| JP | 2006-83817 | 3/2006 |
| JP | 2006-322337 | 11/2006 |

OTHER PUBLICATIONS

Chinese Office Action dated Apr. 29, 2011 in Appln. No. 200780049709.9.

Patent Abstracts of Japan, Publication No. 2004-108194, published Apr. 8, 2004.

Extended European Search Report dated Nov. 19, 2010 in Application No. 07850903.1.

\* cited by examiner

CONTROL METHOD OF EXHAUST EMISSION PURIFICATION SYSTEM AND EXHAUST EMISSION PURIFICATION SYSTEM

CROSS REFERENCE TO RELATED APPLICATIONS

This application claims the benefit under 35 U.S.C. Section 371, of PCT International Application Number PCT/JP2007/074433, filed Dec. 19, 2007 and Japanese Application No. 2007-015858 filed Jan. 26, 2007, the contents of which are incorporated herein by reference.

TECHNICAL FIELD

The present invention relates to a control method of an exhaust emission purification system and to the exhaust emission purification system, which can avoid worsening the combustion in an engine cylinder even if the load increases during forced regeneration of a diesel particulate filter (DPF) when the vehicle is stopping.

BACKGROUND ART

A continuous regeneration type diesel particulate filter (hereinafter referred to as the "DPF") apparatus is an exhaust emission purification apparatus which accumulates particulate matter (hereinafter referred to as the "PM") emitted from a diesel engine by the DPF.

In the continuous regeneration type DPF apparatus, the PM accumulated by the DPF is continuously combusted and purified when the temperature of exhaust gas is at least about 350° C. Thus the DPF is self-regenerated. If, however, the exhaust gas temperature is low under a low speed driving and low loading condition or the like, the catalyst temperature becomes low and the catalyst is not activated, which results in difficulty in oxidizing the PM and self-regenerating the DPF. As a result, clogging of the DPF proceeds caused by the deposition of PM in the DPF, thereby raising a problem of exhaust pressure increase by the clogging.

If the amount of PM deposited in the DPF exceeds a predetermined value (a threshold value), forced regeneration is executed to forcefully combust to remove the entrapped PM by forcefully raising the temperature of exhaust gas by applying multistage delayed injection (multiple injection), post-injection, and the like in the cylinder. The forced regeneration combusts hydrocarbons (HCs), which are supplied to the exhaust gas by the post-injection or the like, using an oxidation catalyst positioned at upstream side of the DPF or an oxidation catalyst supported on the DPF. Whereby, by utilizing the oxidation reaction heat, the exhaust gas temperature at inlet of the DPF and on the filter surface of the DPF is raised, thereby raising the DPF temperature to at least a level that the PM accumulated in the DPF combusts. By the temperature raising, PM is combusted and removed.

The forced regeneration is executed either by manual regeneration or by automatic regeneration. For the case of manual regeneration, an alarm is generated to the driver when the clogging of DPF exceeds a predetermined value. On receiving the alarm, the driver presses a button for starting the forced regeneration to execute the forced regeneration. On the other hand, in the automatic regeneration, the forced regeneration is executed even during automatic driving when the clogging of filter exceeds a predetermined value without specifically generating alarm to the driver.

According to the forced regeneration, the vehicle is in the stopping state, even for the automatic regeneration, in the cases that the forced regeneration is executed when an idling state continues for a predetermined period or longer, and that the driving state at the beginning of the forced regeneration enters the vehicle stopping state. Furthermore, according to the forced regeneration, the vehicle is in the stopping state in the case of manual regeneration when the driver stops the vehicle and presses the switch of forced regeneration. Regarding the forced regeneration in the vehicle stopping state, there is a case of executing control by closing the exhaust throttle valve (exhaust brake valve or exhaust throttle valve) to increase the engine load to hold the temperature of DPF.

For example, Japanese Patent Application Kokai Publication No. 2005-139992 (paragraph [0040]) discloses a regeneration control, as described below, in an exhaust purification apparatus provided with a means for supplying fuel at upstream side of the DPF. According to the apparatus, regeneration control is given by increasing the idling rotational speed from the normal speed at the fuel-supply time in the idling state. In the regeneration control, the amount of exhaust flow is reduced through closing a means for throttling exhaust such as exhaust brake. By the action, the exhaust resistance increases to make the inflow of intake air of relatively low temperature into the cylinder difficult, thereby increasing the amount of remained exhaust gas at a relatively high temperature. The air in the cylinder containing relatively large amount of the exhaust gas at a relatively high temperature, is compressed in the succeeding compression step to enter the explosion stage, which attains further raising the exhaust gas temperature.

In addition, for example, Japanese Patent Application Kokai Publication No. 2005-282545 proposes an exhaust emission purification system executing control of an exhaust throttle valve, as described below, during operation of a means for raising exhaust gas temperature at the time of small entrapping amount using a multiple injection (multistage delayed injection) of the DPF forced regeneration. That is, in the driving state, the exhaust throttle valve (exhaust brake valve or exhaust throttle valve) is opened, and for the case of transition from the driving state to the vehicle stopping state, the exhaust throttle valve is closed, and further in the case of transition from the vehicle stopping state to the driving state, the exhaust throttle valve is closed.

In these cases, however, there arise following-described problems. During forced regeneration in the vehicle stopping state, there are cases of increase in the engine load in a refrigeration vehicle, for example, by starting the compressor of refrigerator. At the time of increase in the engine load, if the exhaust throttle valve is closed, fresh air is difficult to enter the engine cylinder so that the amount of intake air decreases to deteriorate the combustion in the cylinder.

SUMMARY OF THE INVENTION

The present invention has been perfected to solve the above problems, and an object of the present invention is to provide a control method of exhaust emission purification system and the exhaust emission purification system, in which when the forced regeneration of diesel particulate filter (DPF) to purify the particulate matter (PM) in exhaust gas is executed by closing the exhaust throttle valve in the vehicle stopping state, the exhaust throttle valve is opened if the engine load increases to take fresh air in an engine cylinder, thus keeping the combustion in the cylinder under a good condition.

A control method of exhaust emission purification system to achieve the above object is a control method thereof provided with an exhaust emission purification apparatus having a diesel particulate filter in the exhaust passage of an internal combustion engine mounted on a vehicle, wherein the method has the step of opening an exhaust throttle valve if the engine load reaches at least a predetermined first judgment value during execution of forced regeneration control with the exhaust throttle valve closed when the vehicle is stopping.

With this arrangement, if the load rapidly increases when the vehicle is stopping and during the regeneration, the control allows promptly opening the exhaust throttle valve such as exhaust brake valve and exhaust throttle valve, and thus the amount of intake air is secured. Accordingly, even if the load rapidly increases in the case of, for example, starting rapid refrigeration in a refrigeration vehicle, occurrence of defect of worsened combustion can be avoided.

In the above-described control method of exhaust emission purification system, an alarm of failure of the exhaust throttle valve is generated if the engine load reaches at least a predetermined second judgment value that is larger than the predetermined first judgment value. With the method, if the exhaust throttle valve fails by clogging caused by sticking and the like to excessively increase the load, an alarm can be given to the driver by turning on a trouble-lamp and the like, thus notifying the driver of the clogging of the exhaust throttle valve. The second judgment value is set to a higher value than the first judgment value.

An exhaust emission purification system to achieve the above object is the one which has an exhaust emission purification apparatus having a diesel particulate filter in the exhaust passage of an internal combustion engine mounted on a vehicle, and a control apparatus executing forced regeneration of the diesel particulate filter, wherein the control apparatus opens the exhaust throttle valve if the engine load reaches at least a predetermined first judgment value during execution of forced regeneration control with the exhaust throttle valve closed when the vehicle is stopping.

With the structure, if the load rapidly increases during the regeneration in the vehicle stopping state, the control allows promptly opening the exhaust throttle valve, and thus the amount of intake air is secured. Accordingly, even if the load rapidly increases in the case of, for example, starting rapid-refrigeration in a refrigeration vehicle, occurrence of defect of worsened combustion can be avoided.

The above exhaust emission purification system is structured so that the control apparatus generates an alarm indicating that the exhaust throttle valve is in failure, if the engine load reaches at least a predetermined second judgment value which is larger than the predetermined first judgment value. With the structure, if the exhaust throttle valve fails by clogging caused by sticking and the like to excessively increase the load, an alarm can be given to the driver by turning on a trouble-lamp and the like, thus notifying the driver of the clogging of the exhaust throttle valve.

Examples of the exhaust emission purification system are: the one provided with an exhaust emission purification apparatus having arranged, from upstream to downstream in the exhaust passage of an internal combustion engine, an oxidation catalyst apparatus supporting an oxidation catalyst thereon, and a DPF in this order; and the one provided with an exhaust emission purification apparatus having a DPF supporting an oxidation catalyst thereon, in the exhaust passage in an internal combustion engine.

According to the control method of an exhaust emission purification system and the exhaust emission purification system of the present invention, the exhaust throttle valve is opened when the engine load increases even if the forced regeneration of DPF for purifying PM in the exhaust gas is executed with the exhaust throttle valve closed when the vehicle is stopping. By the action, fresh air is taken in the engine cylinder, and thus the combustion in the cylinder can be kept in a good state.

DESCRIPTION OF THE EMBODIMENTS

Figure 1:
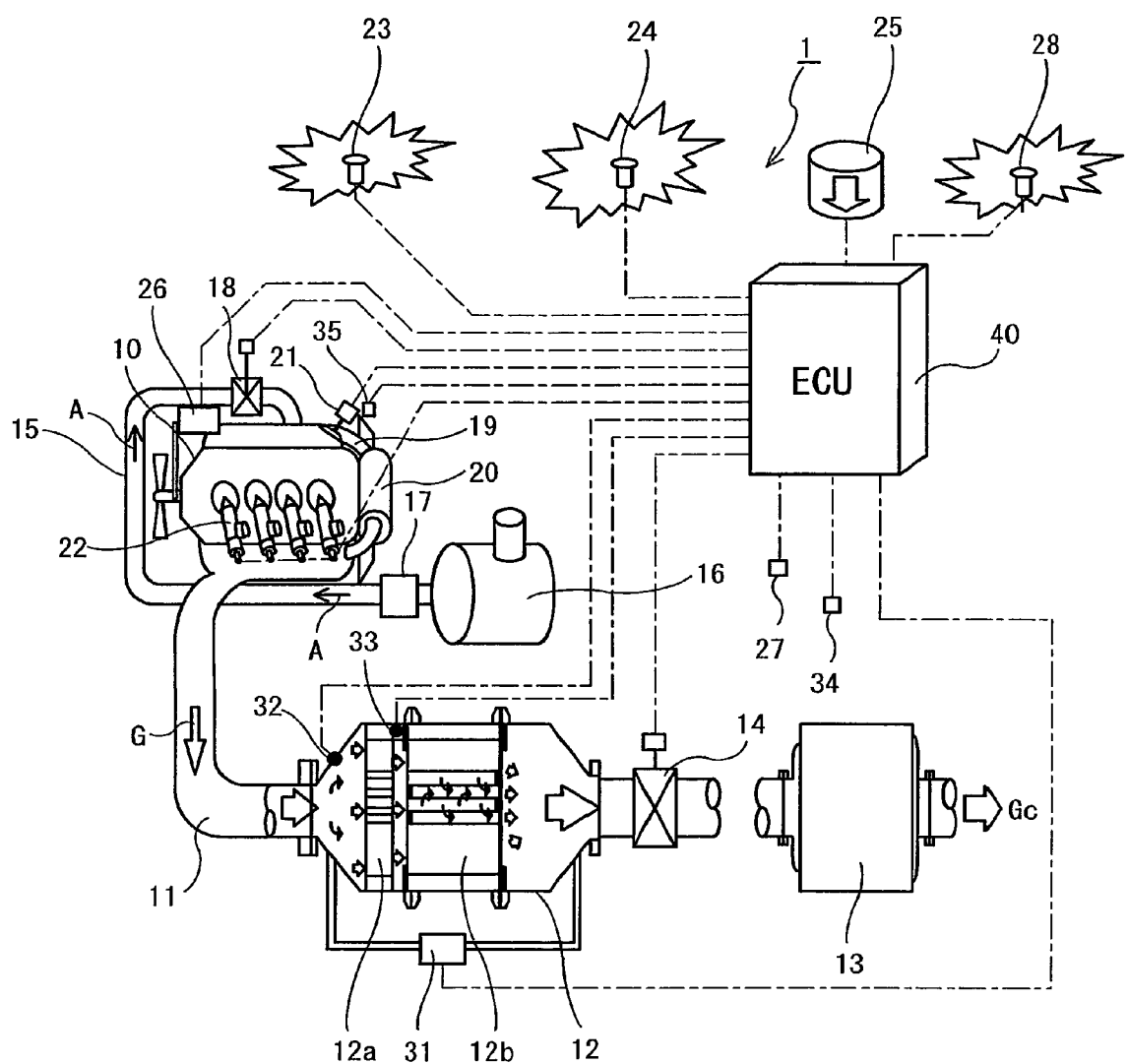
FIG. 1 illustrates the total structure of an exhaust emission purification system according to an embodiment of the present invention.

Description will be given below of embodiments of the control method of an exhaust emission purification system and the exhaust emission purification system according to the present invention referring to the drawings. FIG. 1 illustrates an exhaust emission purification system 1 of an embodiment.

The exhaust emission purification system 1 is structured having an exhaust emission purification apparatus 12 and a silencer 13, arranged in an exhaust passage 11 of a diesel engine (internal combustion engine) 10. The exhaust emission purification apparatus 12 is one of the continuous regeneration type diesel particulate filter (DPF) apparatuses. The exhaust emission purification apparatus 12 is structured by arranging an oxidation catalyst apparatus 12a at upstream side, and a filter apparatus with catalyst (DPF) 12b at downstream side.

The oxidation catalyst apparatus 12a is formed by a support of porous ceramic honeycomb structure and the like, on which an oxidation catalyst such as platinum is supported. The filter apparatus with catalyst 12b is formed by a monolith honeycomb wall-flow type filter prepared from porous ceramic honeycomb channels sealed at inlet and outlet alternately, or the like. A catalyst such as platinum and cerium oxide is supported on the filter part. The particulate matter (PM) in the exhaust gas G is accumulated at the porous ceramic wall.

To estimate the amount of deposition of PM in the filter apparatus with catalyst 12b, a pressure-difference sensor 31 is placed in a conduit pipe connecting both the inlet and the outlet of the exhaust emission purification apparatus 12. In addition, an exhaust throttle valve 14 as a means for throttling the exhaust is positioned at upstream side or downstream side of the exhaust emission purification apparatus 12. Instead of the exhaust throttle valve 14, an exhaust brake valve may be used. In that case, the exhaust brake valve is located at upstream side of the exhaust emission purification apparatus 12.

In an intake air passage 15, there are arranged an air cleaner 16, an MAF sensor (intake air amount sensor) 17, and an intake air throttle valve (intake throttle) 18. The intake air throttle valve 18 adjusts the amount of intake air A entering the intake air manifold. In an EGR passage 19, there are arranged an EGR cooler 20 and an EGR valve 21 that adjusts the EGR amount.

Furthermore, for controlling forced regeneration of the filter apparatus with catalyst 12b, an exhaust gas temperature sensor 32 at inlet of the oxidation catalyst is positioned at upstream side of the oxidation catalyst apparatus 12a, and an exhaust gas temperature sensor 33 at inlet of the filter is positioned between the oxidation catalyst apparatus 12a and the filter apparatus with catalyst 12b. The exhaust gas temperature sensor 32 at inlet of the oxidation catalyst detects an exhaust gas temperature $Tg_1$ at inlet of the oxidation catalyst, which is the temperature of exhaust gas flowing into the oxidation catalyst apparatus 12a. The exhaust gas temperature sensor 33 at inlet of the filter detects an exhaust gas temperature $Tg_2$ at inlet of the filter, which is the temperature of exhaust gas flowing into the filter apparatus with catalyst 12b.

The output values of these sensors are input in a control apparatus (engine control unit, ECU) 40 that executes total control of the operation of engine 10 and also executes the forced regeneration control of the exhaust emission purification apparatus 12. By the control signals output from the control apparatus 40, the exhaust throttle valve 14, the intake air throttle valve 18, the EGR valve 21, and a fuel injection apparatus (injection nozzle) 22, and the like are controlled.

The fuel injection apparatus 22 is connected to a common rail injection system (not shown) that temporarily stores the high-pressure fuel pressurized by a fuel pump (not shown). To the control apparatus 40, there is input information such as the accelerator opening transmitted from an accelerator position sensor (APS) 34 and the engine speed, and further input information of vehicle speed transmitted from a engine speed sensor 35, temperature of cooling water, and the like to operate the engine. The control apparatus 40 outputs a signal of power-application period so that the fuel injection apparatus 22 injects a predetermined amount of fuel.

There are also provided a flickering lamp (DPF lamp) 23 and an abnormality indication lamp 24, which are alarm means to raise caution, and further provided a manual regeneration button (manual regeneration switch) 25. In the forced regeneration control of the exhaust emission purification apparatus 12, not only forced regeneration automatically executes during driving, but also these devices and means raise caution to the driver during driving in case of clogging the filter apparatus with catalyst 12b during driving resulting from exceeding a predetermined value of the accumulated amount of PM of the filter apparatus with catalyst 12b, thus allowing, the driver to stop the vehicle arbitrarily to execute the forced regeneration. In addition, a compressor 26 of refrigerator, a rapid refrigeration switch 27, and the trouble-lamp 28 are arranged near the engine 10. The signal of the rapid refrigeration switch 27 is input in the control apparatus 40. Furthermore, a trouble-lamp 28 is turned ON when the failure of the exhaust throttle valve 14 is detected.

According to the control of the exhaust emission purification system 1, PM is captured in the normal driving state. In the normal driving state, the control monitors the timing of the start of forced regeneration. If the control judges that the time of forced regeneration has come, the forced regeneration is executed. The forced regeneration has two types: the one is automatic regeneration executing the forced regeneration during driving; and the other is manual regeneration executed after stopping the vehicle by the operator on receiving alarm, and by pressing the manual regeneration button 25. These regenerations are adequately selected and executed depending on the drive distance and the value of pressure difference across the DPF. The manual regeneration can solve the problem of oil dilution. The oil dilution problem is a problem of diluting engine oil (lubricant oil) by entering a non-combusted fuel in the engine oil caused by the post-injection during the forced regeneration executed during driving for the case of automatic regeneration in the driving state. The automatic regeneration when no oil dilution problem occurs reduces the troublesome work of manual regeneration to input the signal for starting regeneration control by the driver (such as stopping the vehicle and pressing the regeneration button).

According to the forced regeneration, the multistage delayed injection (multiple injection) is given to increase the exhaust gas temperature, and the post-injection is given at the time when the exhaust gas temperature $Tg_2$ at inlet of the filter or the exhaust gas temperature $Tg_1$ at inlet of the oxidation catalyst reaches at least a predetermined temperature (about 250° C.). By the action, the exhaust gas temperature $Tg_2$ at inlet of the filter is raised to execute the forced regeneration. The exhaust gas temperature $Tg_2$ at inlet of the filter is detected by the exhaust gas temperature sensor 33 at inlet of the filter, while the exhaust gas temperature $Tg_1$ at inlet of the oxidation catalyst is detected by the exhaust gas temperature sensor 32 at inlet of the oxidation catalyst. According to the forced regeneration, when the vehicle is in the stopping state, the exhaust throttle valve 14 is closed to execute exhaust throttling. The regeneration control apparatus that executes the forced regeneration is integrated with the control apparatus 40.

According to the present invention, when the engine load increases to reach at least the predetermined first judgment value during the forced regeneration in the vehicle-stopping state by pressing the rapid refrigeration switch 27 of the refrigeration vehicle, or the like, or in other words, when the fuel injection amount Qf reaches at least the predetermined first judgment value $Qf_1$, the control is given to open the exhaust throttle valve 14. The fuel injection amount Qf is a target fuel injection amount that is determined by a preliminarily input map data. Alternatively, when the fuel injection amount Qf reaches at least the predetermined second judgment value $Qf_2$, the control judges that the failure caused by the clogging of the exhaust throttle valve 14 occurred, and turns the trouble-lamp 28 ON to generate alarm of failure to the driver. The second judgment value $Qf_2$ is set at larger value than the first judgment value $Qf_1$. Both the first judgment value $Qf_1$ and the second judgment value $Qf_2$ are determined by a test result and the like, and are input and stored in the control apparatus 40 in advance.

The following is the description about the method for judging the start of forced regeneration in the exhaust emission purification system 1. The judgment of staring the forced regeneration can be done by a known method. For example, adding to the judgment of starting time of forced regeneration based on the comparison between the pressure difference $\Delta P$ across the DPF and a predetermined threshold value of pressure difference $\Delta Ps$ across the DPF, there is applied a judgment of starting time of forced regeneration based on the comparison between the vehicle drive distance $\Delta M$ after preceding forced regeneration and a predetermined threshold value of drive distance $\Delta Ms$. For example, the forced regeneration is executed at the time of $\Delta P \geq \Delta Ps$ or $\Delta M \geq \Delta Ms$.

Next, the following is the description about the control in the exhaust emission purification system 1 referring to the control flow scheme. According to the control, PM is captured in the normal driving state. In the normal driving state, the control monitors the timing of the start of forced regeneration. If the control judges that the time of forced regeneration has come, alarm is generated or the automatic regeneration is executed in the driving state. For the case of alarm generation, the driver receiving the alarm stops the vehicle, and presses the manual regeneration button 25 to execute the forced regeneration.

Figure 2:
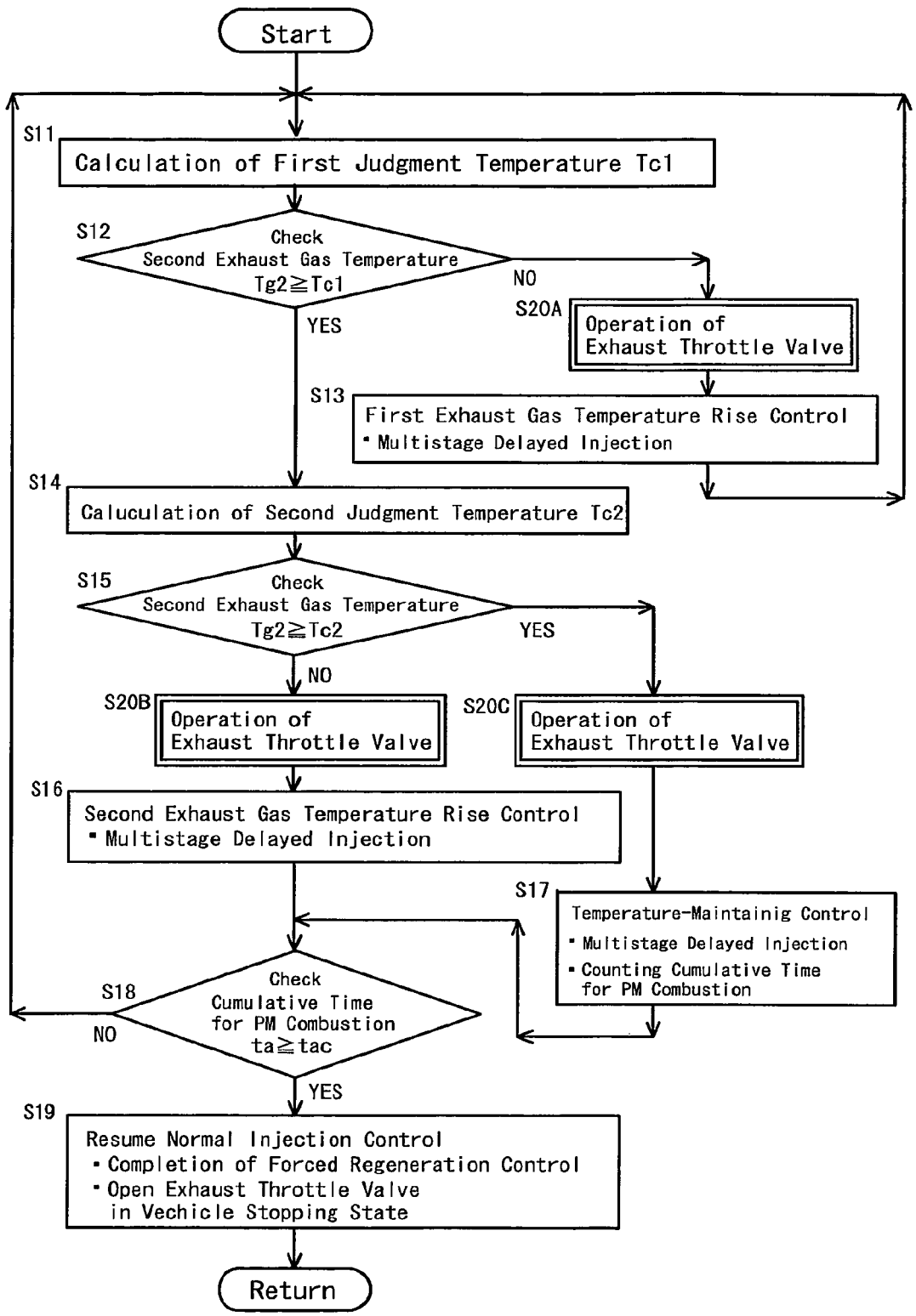
FIG. 2 shows an example of control flow of forced regeneration according to an embodiment of the present invention.

Then, according to the embodiment, the forced regeneration by the manual regeneration or the automatic regeneration is executed in accordance with the control flow diagram illustrated in FIG. 2. In the control flow of forced regeneration in FIG. 2, the index temperature for the catalyst temperature, which indexes the temperature of the oxidation catalyst (bed temperature) adopts the second exhaust gas temperature $Tg_2$ detected by the exhaust gas temperature sensor 33 at inlet of the filter. When the second exhaust gas temperature $Tg_2$ reaches at least the predetermined first judgment temperature $Tc_1$, the post-injection is applied to supply the non-combusted fuel at upstream side of the oxidation catalyst apparatus 12a. As the index temperature for the filter temperature, which indexes the temperature of the filter apparatus with catalyst 12b, also the second exhaust gas temperature $Tg_2$ is adopted. The second exhaust gas temperature $Tg_2$ is detected by the exhaust gas temperature 33 at inlet of the filter. When the second exhaust gas temperature $Tg_2$ reaches at least the predetermined second judgment temperature $Tc_2$, the temperature-maintaining control is executed by the multistage delayed injection without giving post-injection.

Once the control flow of FIG. 2 started, Step S11 calculates the first judgment temperature $Tc_1$. The first judgment temperature $Tc_1$ is the temperature (about 250° C., for example) at which HCs are fully oxidized by the oxidation catalyst in the oxidation catalyst apparatus 12a when the second exhaust gas temperature (index temperature for the catalyst temperature) $Tg_2$ becomes that temperature. The second exhaust gas temperature (index temperature for the catalyst temperature) $Tg_2$ is the exhaust gas temperature detected by the exhaust gas temperature sensor 33 at inlet of the filter. The HCs are non-combusted fuel supplied by the post-injection. The first judgment temperature $Tc_1$ may use a value that varies with the engine speed Ne at that time. Instead of the second exhaust gas temperature $Tg_2$ detected by the exhaust gas temperature sensor 33 at inlet of the filter, there may be used the first exhaust gas temperature $Tg_1$ detected by the gas temperature sensor 32 at inlet of the oxidation catalyst.

The next Step S12 executes the check of the second exhaust gas temperature (index temperature for the catalyst temperature) Tg2. If the second exhaust gas temperature $Tg_2$ is lower than the first judgment temperature $Tg_1$ calculated in Step S11, Step S20A operates the exhaust throttle valve 14, and then Step S13 executes the first exhaust gas temperature rise control for a predetermined period $\Delta t_1$ (a time relating to the interval of check of the second exhaust gas temperature $Tg_2$ in Step S13).

Figure 3:
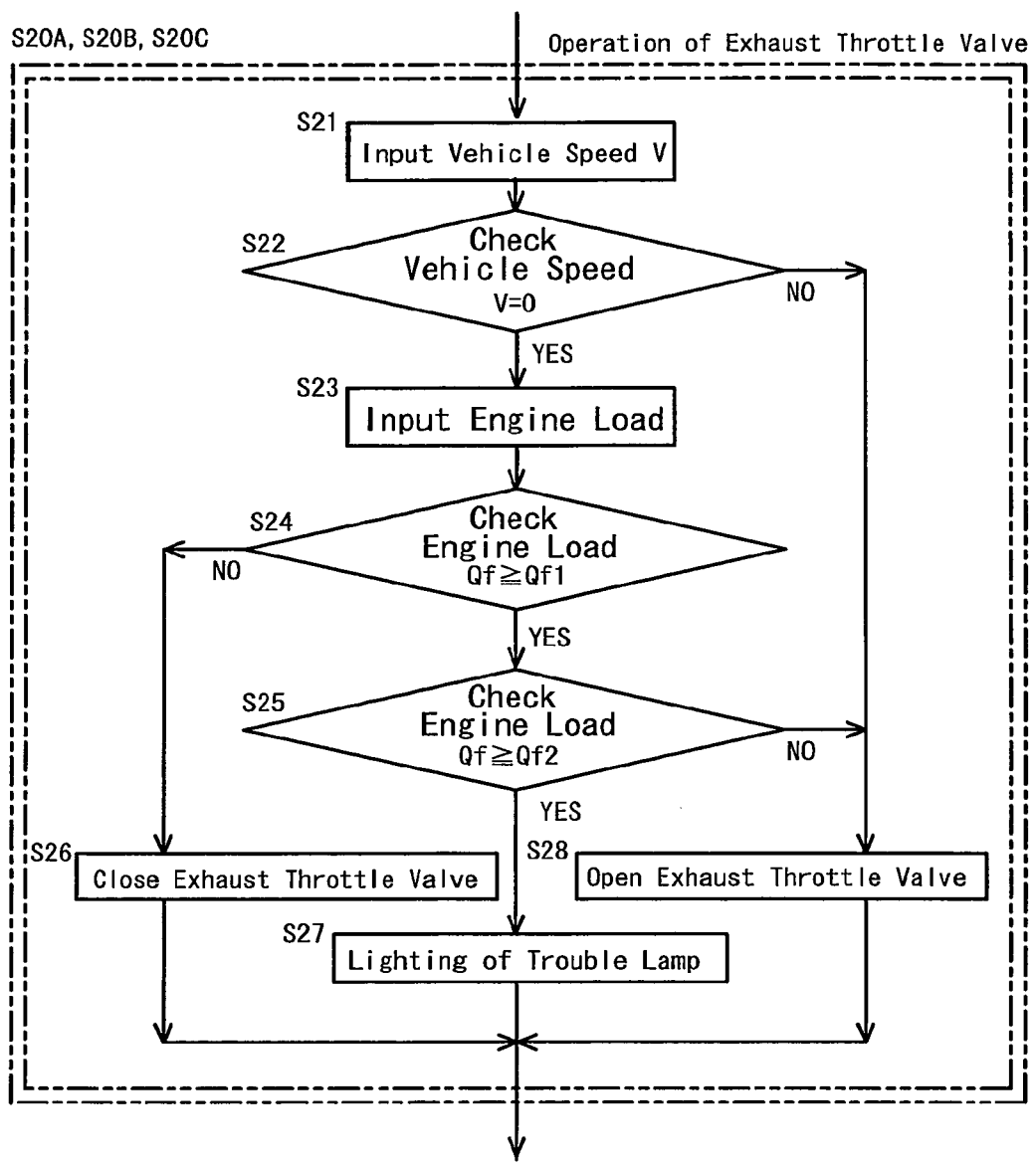
FIG. 3 shows an example of control flow of the operation of an exhaust throttle valve according to an embodiment of the present invention.

The operation of the exhaust throttle valve in Step S20A is done in accordance with the control flow illustrated in FIG. 3. Step S20B and Step S20C are also executed in a similar manner to that of Step S20A. Once entering the control flow of FIG. 3, Step S21 inputs the vehicle speed V obtained from a vehicle speed sensor (not shown), and the next Step S22 executes the check of vehicle speed. The judgment of vehicle in the stopping state or not in the stopping state is given by the vehicle speed V (zero or not). The judgment of vehicle in the stopping state or not in the stopping state may be given by a combination of the accelerator position sensor 34, a side brake switch, a parking brake switch, a clutch, and the like, not depending on the vehicle speed. When the vehicle speed V is zero, (YES), Step S23 begins. If the vehicle speed V is not zero, (NO), Step S28 begins to open the exhaust throttle valve 14. If the exhaust throttle valve has already been opened, the opening state is sustained. At Step 28, Step S20A (Step S20B or Step S20C) is completed, and the next Step S13 (Step S16 or Step S17) begins.

Step S23 inputs the fuel injection amount Qf, and the next Step S24 checks whether the engine load reaches at least the predetermined first judgment value, using the fuel injection amount Qf. The fuel injection amount Qf is the target fuel injection amount determined by a predetermined map data and the like. When the fuel injection amount Qf is at least the predetermined first judgment value $Qf_1$, (YES), Step S25 begins. If the fuel injection amount Qf does not reach the predetermined first judgment value $Qf_1$, (NO), Step S26 begins to close the exhaust throttle valve 14. If the exhaust throttle valve has already been closed, the closing state is sustained. At Step 26, Step S20A (Step S20B or Step S20C) is completed, and the next Step S13 (or Step S16 or Step S17) begins.

Step S25 checks whether the engine load reaches at least the predetermined second judgment value, by determining whether the fuel injection amount Qf is at least the predetermined second judgment value $Qf_2$. When the fuel injection amount Qf is at least the predetermined second judgment value $Qf_2$, (YES), Step S25 judges that the exhaust throttle valve 14 is clogged by sticking, and Step S27 begins and the trouble-lamp 28 is turned ON. If the fuel injection amount Qf does not reach the predetermined second judgment value $Qf_2$, (NO), Step S25 judges that the exhaust throttle valve 14 is in the normal state, and Step S28 begins to open the exhaust throttle valve 14. If the exhaust throttle valve has already been opened, the open state is sustained. At Step 27 or Step 28, Step S20A (Step S20B or Step S20C) is completed, and the next Step S13 (Step S16 or Step S17) begins.

By the control of operation of the exhaust throttle valve in Step S20A (S20B or S20C), the exhaust throttle valve 14 can be kept open if the vehicle is in the stopping state during the regeneration control and moreover if the fuel injection amount Qf is lower than the predetermined first judgment value $Qf_1$. During the regeneration control and in the vehicle stopping state, if the fuel injection amount Qf reaches at least the predetermined first judgment value $Qf_1$, the exhaust throttle valve 14 can be kept open. Furthermore, during the regeneration control and moreover in the vehicle stopping state, if the fuel injection amount Qf reaches at least the predetermined second judgment value $Qf_2$, the trouble-lamp 28 is turned ON, and thus an alarm to the driver can be given.

In the first exhaust gas temperature rise control in Step S13 after Step S20A, the multistage delayed injection is executed based on the first map data for the multistage delayed injection without applying post-injection. That is, during the control of the multistage delayed injection, the injection amount and the injection timing of multistage delayed injection are calculated based on the detected engine speed and the fuel injection amount, referring to the first map data for the multistage delayed injection, thus executing the multistage delayed injection. The fuel injection amount is calculated from the detected opening of accelerator, or the like. The first map data for the multistage delayed injection, determining the injection amount and the injection timing of the multistage delayed injection, is the map data based on the engine speed and the fuel injection amount. The fuel injection amount is the one calculated from the detected opening of accelerator, and the like. The map data is preliminarily determined by experiment, calculation, and the like, and is input in the control apparatus. According to the multistage delayed injection, the injection amount of the multistage delayed injection is increased, and the timing of multistage delayed injection is delayed from the fuel injection timing in the normal driving state. The multistage delayed injection increases the temperature rise efficiency of the exhaust gas to attain prompt to raise the temperature of the exhaust gas.

To improve the temperature rise efficiency of the exhaust gas, when the vehicle is in the stopping state and moreover when the fuel injection amount Qf is smaller than the predetermined first judgment value $Qf_1$, the operation of closing the exhaust throttle valve 14 (or the operation to keep closing state) in Step S20A prevents the heat release and increases the engine load. The operation efficiently raises the temperature of exhaust gas within a short time, and thus improves the temperature rise performance of the oxidation catalyst apparatus 12a.

After Step S13, the procedure returns to Step S11. If the judgment in Step S12 identifies that the second exhaust gas temperature $Tg_2$ reaches at least the predetermined first judgment temperature $Tc_1$, Step S14 begins. Alternatively, the following may be applied. That is, as the index temperature for the catalyst temperature which indexes the temperature of oxidation catalyst, there are used both of the second exhaust gas temperature $Tg_2$ which is detected by the exhaust gas temperature sensor 33 at inlet of the filter and the first exhaust gas temperature $Tg_1$ which is detected by the exhaust gas temperature sensor 32 at inlet of the oxidation catalyst. As the predetermined judgment temperature for each of both thereof, the first judgment temperature $Tc_1$ and a third judgment temperature $Tc_3$ are used. When the second exhaust gas temperature $Tg_2$ exceeds the first judgment temperature $Tc_1$, and moreover when the first exhaust gas temperature $Tg_1$ exceeds the third judgment temperature $Tc_3$, the non-combusted fuel is supplied to upstream side of the oxidation catalyst apparatus 12a by the post-injection.

Step S14 calculates the second judgment temperature $Tc_2$. The second judgment temperature $Tc_2$ is the target temperature of the second exhaust gas temperature rise control in Step S16. By keeping the second exhaust gas temperature (index temperature for the filter temperature) $Tg_2$ at or above the temperature $Tc_2$, the combustion of PM captured by the filter apparatus with catalyst 12b is kept in a good state. The second exhaust gas temperature $Tg_2$ is the exhaust gas temperature detected by the exhaust gas temperature sensor 33 at inlet of the filter. The second judgment temperature $Tc_2$ is normally set to above the temperature of beginning the combustion of PM, (about 350° C., for example), at about 500° C. for example. The value of the second judgment temperature $Tc_2$ may be varied in multistage with time.

The next Step S15 executes check of the second exhaust gas temperature (index temperature for the filter temperature) $Tg_2$. When the second exhaust gas temperature $Tg_2$ is lower than the second judgment temperature $Tc_2$, Step S20B operates the exhaust throttle valve 14 in a similar procedure to that of Step S20A, and then there begins the second exhaust gas temperature rise control in Step S16. When the second exhaust gas temperature $Tg_2$ is at least the second judgment temperature $Tc_2$, Step S20C operates the exhaust throttle valve 14 in a similar procedure to that of Step S20A, and then the temperature-maintaining control of Step S17 is begun.

Step S16 executes the second exhaust gas temperature rise control for a predetermined period of $\Delta t_2$ (the time relating to the interval of check of the second exhaust gas temperature $Tg_2$ in Step S15). In the second exhaust gas temperature rise control, the multistage delayed injection is given based on the second map data for the multistage delayed injection, different from the first map data for the multistage delayed injection. The second map data for the multistage delayed injection, determining the injection amount and the injection timing of the multistage delayed injection, is the map data based on the engine speed and the fuel injection amount, similar to the first map data for the multistage delayed injection. The fuel injection amount is the one calculated from the detected opening of accelerator, and the like. The map data is preliminarily set by experiment, calculation, and the like, and is input in the control apparatus.

According to the multistage delayed injection, the injection amount of the multistage delayed injection is decreased to an amount necessary to keep the exhaust gas temperature. Regarding the injection timing of the multistage delayed injection, the delay is decreased from the injection timing of the multistage delayed injection in Step S13 of the first exhaust gas temperature rise control. By the multistage delayed injection, the temperature of exhaust gas is kept to some extent. Simultaneously, the fuel is oxidized at the oxidation catalyst while supplying the fuel to the oxidation catalyst apparatus 12a by the post-injection. As a result, the temperature of exhaust gas flowing into the filter with catalyst 12b is raised.

To improve the temperature rise efficiency of the exhaust gas, when the vehicle is in the stopping state and moreover when the fuel injection amount Qf is smaller than the predetermined first judgment value $Qf_1$, Step S20B closes the exhaust throttle valve 14 (or keeps the closing state). The operation prevents the heat release and increases the engine load. The operation efficiently raises the temperature of exhaust gas within a short time, thus improving the temperature rise performance of the oxidation catalyst apparatus 12a.

Then, by the multistage delayed injection of the second exhaust gas temperature rise control, the raising temperature of the exhaust gas is continued, and the non-combusted fuel (HCs) is supplied into the exhaust gas by the post-injection. The non-combusted fuel is oxidized in the oxidation catalyst apparatus 12a, and the oxidation heat can further raise the temperature of the exhaust gas. When the exhaust gas temperature $Tg_2$ reaches at least the second judgment temperature $Tc_2$, the PM captured by the filter apparatus with catalyst 12b is combusted. The second exhaust gas temperature rise control may continuously increase the second exhaust gas temperature $Tg_2$ to the control-target temperature $Tc_2$, and the raising temperature may be done by two stages or multiple stages. After Step S16, Step S18 begins.

When the judgment in Step S15 identifies that the second exhaust gas temperature $Tg_2$ is at least the second judgment temperature $Tc_2$, Step S17 executes the temperature-maintaining control for a predetermined period $\Delta t_3$ (the time relating to the interval of the check of the continuing time of the second exhaust gas temperature $Tg_2$ of Step S15). The temperature-maintaining control executes the multistage delayed injection for the intracylinder (within the cylinder) injection of the engine 10 without accompanying the post-injection.

Step S17 executes the counting of the cumulative time of PM combustion. The counting is for the cumulative time ta for PM combustion (ta=ta+$\Delta t_3$), given only in the case that the second exhaust gas temperature $Tg_2$ reaches at least the predetermined second judgment temperature $Tc_2$. After Step S17, Step S18 begins.

Step S18 checks the cumulative time ta for PM combustion to judge whether the regeneration control is completed or not. The check determines whether the cumulative time ta for PM combustion exceeded the predetermined judgment time Tac or not. If the ta exceeded the Tac, Step S18 judges that the regeneration control is completed, and Step S19 begins. If the ta did not exceed the Tac, Step S18 judges that the regeneration control is not completed, and the procedure returns to Step S11. Then, until the cumulative time ta for PM combustion exceeds the predetermined judgment time tac, there is executed the first exhaust gas temperature rise control in Step S13, the second exhaust gas temperature rise control in Step S16, or the temperature-maintaining control in Step S17.

Step S19 completes the forced regeneration control, and returns the exhaust throttle valve 14 to the normal driving state to resume the normal injection control, and then the procedure goes to RETURN.

On executing the forced regeneration control, when the second exhaust gas temperature (index temperature for the catalyst temperature) $Tg_2$, is lower than the predetermined first judgment temperature $Tc_1$, the first exhaust gas temperature rise control at Step S13 is executed, and when the index temperature for the catalyst temperature $Tg_2$ (or $Tg_1$), is at least the first judgment temperature $Tc_1$, the second exhaust gas temperature rise control at Step is executed. The second exhaust gas temperature $Tg_2$ is the exhaust gas temperature detected by the exhaust gas temperature sensor 33 at inlet of the filter, or the temperature of exhaust gas entering the filter apparatus with catalyst 12b. The first exhaust gas temperature rise control at Step S13 executes the multistage delayed injection by the intracylinder fuel injection control without accompanying the post-injection. The second exhaust gas temperature rise control at Step S16 executes the post-injection by the intracylinder fuel injection control, adding to the multistage delayed injection.

According to the above-described control method of exhaust emission purification system and the exhaust emission purification system 1, the exhaust throttle valve 14 is opened when the engine load increases even if the forced regeneration of the filter with catalyst 12b for purifying PM in the exhaust gas is executed with the exhaust throttle valve 14 closed when the vehicle is stopping, thus the fresh air is taken in the cylinder of engine 10, and the combustion in the cylinder can be kept in a good state.

The above embodiment described the exhaust emission purification apparatus of the exhaust emission purification system referring to an example of a combination of the oxidation catalyst apparatus 12a at upstream side and the filter with catalyst 12b at downstream side. However, a filter supporting the oxidation catalyst can be applied. In addition, the above embodiment described the method for supplying non-combusted fuel (HCs) to upstream side of the oxidation catalyst 12a referring to an example of the post-injection. However, there can be applied a method of direct-injection in the exhaust pipe, which injects the non-combusted fuel from the non-combusted fuel supply apparatus directly into the exhaust passage 11. In this case, the non-combusted fuel supply apparatus is located in the exhaust passage 11.

The control method of exhaust emission purification system and the exhaust emission purification system according to the present invention, having above-described excellent effect, can be utilized extremely effectively to an exhaust emission purification system for an internal combustion engine mounted on a vehicle, or the like.

What is claimed is:

1. An exhaust emission purification system, comprising:
   an exhaust emission purification apparatus having a diesel particulate filter in an exhaust passage of an internal combustion engine mounted on a vehicle; and
   a control apparatus executing forced regeneration of said diesel particulate filter,
   wherein, when an exhaust throttle valve is closed and the vehicle is stopping, the control apparatus opens the exhaust throttle valve if an engine load reaches at least a predetermined first judgment value during execution of forced regeneration control, and
   wherein said control apparatus judges a failure of said exhaust throttle valve if the engine load reaches at least a second judgment value which is larger than said predetermined first judgment value.

2. The system according to claim 1, further comprising:
   an alarm which signifies that the control apparatus has judged the failure.

3. A control method of an exhaust emission purification system, comprising:
   providing an exhaust emission purification apparatus having a diesel particulate filter in an exhaust passage of an internal combustion engine mounted on a vehicle;
   when an exhaust throttle valve is closed and the vehicle is stopping, opening the exhaust throttle valve if an engine load reaches at least a predetermined first judgment value during execution of forced regeneration control; and
   judging a failure of said exhaust throttle valve if the engine load reaches at least a predetermined second judgment value which is larger than said predetermined first judgment value.

4. The method according to claim 3, further comprising:
   generating an alarm after the judging of the failure.

* * * * *